United States Patent [19]

Aydin et al.

[11] Patent Number: 5,442,006

[45] Date of Patent: * Aug. 15, 1995

[54] AQUEOUS POLYMER DISPERSION HAVING A WIDE PARTICLE SIZE DISTRIBUTION

[75] Inventors: Oral Aydin, Mannheim; Michael Portugall, Wachenheim; Josef Neutzner, Neustadt; Walter Maechtle, Ludwigshafen, all of Germany

[73] Assignee: BASF Aktiengesellschaft, Ludwigshafen, Germany

[ * ] Notice: The portion of the term of this patent subsequent to Jun. 20, 2012 has been disclaimed.

[21] Appl. No.: 229,631

[22] Filed: Apr. 19, 1994

Related U.S. Application Data

[62] Division of Ser. No. 38,863, Mar. 29, 1993, Pat. No. 5,352,720.

[30] Foreign Application Priority Data

Apr. 29, 1992 [DE] Germany .................. 42 13 967.8

[51] Int. Cl.$^6$ .............................................. C08L 13/02
[52] U.S. Cl. ................... 524/457; 524/458; 524/460; 524/555; 524/556; 524/558; 524/560; 524/162
[58] Field of Search ............ 524/457, 458, 460, 555, 524/556, 558, 566, 162, 161, 159

[56] References Cited

U.S. PATENT DOCUMENTS

| | | | |
|---|---|---|---|
| 3,424,706 | 1/1969 | Smith et al. | 524/460 |
| 4,123,403 | 10/1978 | Warner et al. | 524/558 |
| 4,322,328 | 3/1982 | Gratz et al. | 524/458 |

*Primary Examiner*—Jeffrey T. Smith
*Attorney, Agent, or Firm*—Oblon, Spivak, McClelland, Maier & Neustadt

[57] ABSTRACT

An aqueous polymer dispersion with a solids volume concentration of at least 50% by volume is obtainable by polymerizing monomers by the method of free radical aqueous emulsion polymerization with the addition of at least one fine and at least one coarse aqueous starting polymer dispersion.

14 Claims, No Drawings

AQUEOUS POLYMER DISPERSION HAVING A WIDE PARTICLE SIZE DISTRIBUTION

This is a division of application Ser. No. 08/038,863, filed on Mar. 29, 1993 now U.S. Pat. No. 5,352,720.

The present invention relates to a final aqueous polymer dispersion which has a solids volume concentration (solids volume=solids mass divided by solids density) of at least 50% by volume and is obtainable by polymerizing at least one radical polymerizable monomer with the addition of at least one aqueous starting dispersion I of a starting polymer I and with the addition of at least one aqueous starting dispersion II of a starting polymer II in a polymerization vessel by the method of free radical aqueous emulsion polymerization in the presence of surface active substances and free radical polymerization initiators with the proviso that a) the starting polymer I is present in the at least one aqueous starting dispersion I in the form of dispersed starting polymer particles I whose non-zero weight average particle diameter is equal to or less than 50 nm, b) the mass of the at least one starting polymer I added relative to the total mass formed of the mass of the at least one radical polymerizable monomer and of the mass of starting polymers I, II added in the form of aqueous starting dispersions I, II is from 0.2 to 0.7%, c) the starting polymer II is present in the at least one aqueous starting dispersion II in the form of dispersed starting polymer particles II of whose total mass not more than 60% have a non-zero particle diameter $\leq 200$ nm and at least 40% have a particle diameter $> 200$ nm, d) the mass of the at least one starting polymer II added relative to the total mass formed of the mass of the at least one radical polymerizable monomer and of the mass of starting polymers I, II added in the form of aqueous starting dispersions I, II is from 2 to 20%, e) of the total amount of the at least one aqueous starting dispersion I to be added the amount introduced into the polymerization vessel as initial charge prior to the start of the free radical aqueous emulsion polymerization is nil, f) the total amount of the at least one aqueous starting dispersion II to be added is introduced into the polymerization vessel as initial charge prior to the start of the free radical emulsion polymerization, g) of the total amount of the at least one monomer to be polymerized the proportion introduced into the polymerization vessel as initial charge prior to the start of the free radical aqueous emulsion polymerization is nil, h) the total amount of the at least one monomer to be polymerized is added to the polymerization vessel from the start of the free radical aqueous emulsion polymerization in such a way that at any time of this addition the polymerization conversion of the total monomers alreay added previously to the polymerization vessel is at least 80 mol %, i) at any time after the start of the free radical aqueous emulsion polymerization the ratio V of the number of moles of the particles of starting polymer I already added previously to the polymerization vessel in the form of the at least one aqueous starting dispersion I to the number of moles of the amount already added previously to the polymerization vessel of the at least one monomer to be radical polymerized, standardized for the ratio of the number of moles of the total starting polymer particles to be added in the form of the at least one aqueous starting dispersion I to the number of moles of the total amount of monomers to be radical polymerized, is within the range from $>0$ to 10, j) on completion of the addition of the total amount to be added of the at least one aqueous starting dispersion I additionally at most 20 mol % of the total amount of the at least one monomer to be radical polymerized is added to the polymerization vessel, k) the at least one aqueous starting dispersion I to be added contains at least 10–50% by weight, based on its starting polymer I content, of surface active substances, l) the at least one aqueous starting dispersion II to be added contains at least 1–5% by weight, based on its starting polymer II content, of surface active substances, m) the final aqueous polymer dispersion contains from 1 to 5% by weight of the surface active substances, based on the total mass formed of the mass of the at least one radical polymerizable monomer and of the masses of starting polymers I, II to be added in the form of aqueous starting dispersions I, II, n) the amount of surface active substances contained in the polymerization vessel at any time from the start of the free radical aqueous emulsion polymerization minus the minimum amounts mentioned under k), l) of surface active substances introduced into the polymerization vessel is less than 5% by weight, based on the monomers already added previously to the polymerization vessel, and o) the total amount used of free radical polymerization initiators is from 0.1 to 5% by weight, based on the total amount of the at least one monomer to be radical polymerized, and is added to the polymerization vessel in the course of the free radical aqueous emulsion polymerization in such a way that the free radical aqueous emulsion polymerization continues to a minimum polymerization conversion of the total amount of the at least one monomer to be polymerized of at least 90 mol %.

The present invention further relates to the process for preparing such final aqueous polymer dispersions and to the use thereof as binders and as materials for preparing coatings and adhesive joints.

Aqueous polymer dispersions are systems comprising polymer particles dispersed as disperse phase in an aqueous dispersion medium.

Polymer solutions form polymer films as the solvent evaporates. Aqueous polymer dispersions behave the same way on evaporation of the aqueous dispersion medium, which is why aqueous polymer dispersions find varied use as binders, for example for paints or for leather coatings.

Aqueous polymer dispersions having a high polymer content are of particular advantage in that, on the one hand, their relatively lower proportion of aqueous dispersion medium reduces the energy required for evaporating it, for example for film formation or for preparing polymer powders, and, on the other, the useful polymer can be stored and transported using a relatively smaller amount of aqueous phase as carrier medium.

However, there is a disadvantage in that, as the volume concentration of the polymer increases (U.S. Pat. No. 4,130,523), there are problems with the preparation of aqueous polymer dispersions. For instance, the flow resistance (viscosity) increases and this increased viscosity makes it difficult not only to remove the heat of reaction but also to process the aqueous dispersion; secondly, there is an increasing tendency for the dispersed polymer particles to aggregate for reasons of thermodynamic stability. The resulting flocs [a) microflocs or specks; not normally removable by conventional filtration; b) macroflocs or coagulum; normally removable by conventional filtration] interfere in particular with the film forming of the aqueous polymer dispersions and are therefore generally undesirable.

According to studies about the flow resistance of aqueous polymer dispersions, those having a broad size distribution (polydispersity) of the dispersed polymer particles for the same solids content generally have a lower flow resistance than those with a narrow size distribution (which are in the extreme case monodispersed). Furthermore, coarse aqueous polymer dispersions have a lower flow resistance than fine aqueous polymer dispersions, given the same solids content.

EP-A-129 699 discloses a process for preparing an aqueous polymer dispersion wherein unsaturated monomers are polymerized in a conventional manner in a polymerization vessel by the method of free radical aqueous emulsion polymerization with the addition of an aqueous dispersion of a starting polymer such that the addition of the aqueous dispersion of the starting polymer must be concluded before 40% by weight of the total monomers to be polymerized have copolymerized and must not start before the average particle size of the emulsion polymer formed in the course of the polymerization of the monomers is twice that of the aqueous dispersion of the starting polymer. In fact, the aqueous dispersion of the starting polymer is preferably not added over a prolonged period but all at once.

The disadvantages of the aqueous polymer dispersions thus obtainable are that their flow resistance is not fully satisfactory above a solids volume concentration of 50% by volume and that, according to the embodiment examples, the solids volume concentration is limited to values below 65% by volume.

U.S. Pat. No. 4,130,523 concerns a process for preparing aqueous polymer dispersions wherein aqueous polymer dispersion already formed in the course of the polymerization process is continuously removed from the reaction zone, stored and later reintroduced into the reaction zone as a kind of starting polymer dispersion. A disadvantage of this process is that it is unsuitable for industrial implementation.

U.S. Pat. No. 3,424,706 concerns a process for preparing aqueous dispersions of polymers containing at least 70–97% by weight of vinylidene chloride as copolymerized units, wherein the polymerization of the monomers is effected with the addition of an aqueous dispersion of a starting polymer. The said reference teaches inter alia mixing the monomers to be polymerized and the aqueous dispersion of the starting polymer with one another and adding this mixture to the initial charge comprising part of the polymerization batch.

The disadvantage with this process is that it is restricted to monomer mixtures consisting chiefly of vinylidene chloride. Moreover, according to the illustrative embodiments, the aqueous polymer dispersions obtainable by this process are unsatisfactory not only as regards the flow resistance above a solids volume concentration of 50% by volume but also as regards the upper limit for the solids volume concentration attainable in a still satisfactorily flowable state.

It is an object of the present invention to make available aqueous polymer dispersions that are obtainable in a simple, industrially suitable, reproducible manner not restricted to specific monomers with an increased solids volume concentration but a reduced flow resistance and reduced floc content.

We have found that this object is achieved by the final aqueous polymer dispersions defined at the beginning.

Remarkably, the subject-matter of the invention is not restricted to the free radical aqueous emulsion polymerization of monomer mixtures composed chiefly or exclusively of vinyl and/or vinylidene halides, despite the generally known fact that the development of the disperse phase in the case of monomers other than vinyl and/or vinylidene halides is a significantly more complex phenomenon.

Suitable radical polymerizable monomers for the process of the invention are therefore in particular, inter alia, monoethylenically unsaturated monomers such as olefins, for example ethylene, aromatic vinyl monomers such as styrene, $\alpha$-methylstyrene, o-chlorostyrene or vinyltoluenes, vinyl and vinylidene halides such as vinyl and vinylidene chloride, esters of vinyl alcohol and monocarboxylic acids having from 1 to 18 carbon atoms, such as vinyl acetate, vinyl propionate, vinyl-n-butyrate, vinyl laurate and vinyl stearate, esters of $\alpha,\beta$-monoethylenically unsaturated mono- and dicarboxylic acids preferably of from 3 to 6 carbon atoms, such as, in particular, acrylic acid, methacrylic acid, maleic acid, fumaric acid and itaconic acid, with alkanols in general of from 1 to 12, preferably of from 1 to 8, in particular of from 1 to 4, carbon atoms, such as, in particular, methyl, ethyl, n-butyl, isobutyl and 2-ethylhexyl acrylate and methacrylate, dimethyl maleate or n-butyl maleate, nitriles of $\alpha,\beta$-monoethylenically unsaturated carboxylic acids such as acrylonitrile and also $C_{4-8}$-conjugated dienes such as 1,3-butadiene and isoprene. The monomers mentioned generally form the principal monomers which, based on the total amount of the monomers to be polymerized by the method of free radical aqueous emulsion polymerization, normally account for a proportion of more than 50% by weight. Monomers which polymerized by themselves normally form homopolymers that possess enhanced water solubility are normally included in the polymer only as modifying monomers, in amounts, based on the total amount of monomers to be polymerized, of less than 50% by weight, in general from 0.5 to 20, preferably from 1 to 10%, by weight.

Examples of monomers of this type are $\alpha,\beta$-monoethylenically unsaturated mono- and dicarboxylic acids of from 3 to 6 carbon atoms and amides thereof, e.g. acrylic acid, methacrylic acid, maleic acid, fumaric acid, itaconic acid, acrylamide and methacrylamide, also vinylsulfonic acid and water-soluble salts thereof, and also N-vinylpyrrolidone. Monomers which customarily enhance the internal strength of the films formed from the final aqueous polymer dispersion are in general likewise included in the polymer only in minor amounts, usually from 0.5 to 10% by weight, based on the total amount of monomers to be polymerized. Monomers of this type normally have an epoxy, hydroxyl, N-methylol, carbonyl or at least two nonconjugated ethylenically unsaturated double bonds. Examples thereof are N-alkylolamides of $\alpha,\beta$-monoethylenically unsaturated carboxylic acids of from 3 to 10 carbon atoms or esters thereof with alcohols of from 1 to 4 carbon atoms, of which N-methylolacrylamide and N-methylolmethacrylamide are very particularly preferred, divinyl monomers, divinylidene monomers and also dialkenyl monomers. Particularly suitable instances of these are the diesters of dihydric alcohols with $\alpha,\beta$-monoethylenically unsaturated monocarboxylic acids, of which in turn acrylic and methacrylic acid are preferred. Examples of such monomers having two non-conjugated ethylenically unsaturated double bonds are alkylene glycol diacrylates and dimethacrylates such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. In this connection of particular importance are also $C_1$–$C_8$-hydroxyalkyl methacrylate and acrylate, such as n-hydroxyethyl, n-hydroxypropyl or n-hydroxybutyl acrylate and methacrylate, and also compounds such as diacetoneacrylamide and acetylacetoxyethyl acrylate or methacrylate. As well as monomers having unsaturated double bonds it is possible for minor amounts, customarily from 0.01 to 2% by weight, based on the monomers to be polymerized, of molecular weight regulators, such as tert-dodecyl mercaptan and 3-mercaptopropyltrimethoxysilane to be included in the polymer. It is preferable to add such substances to the polymerization zone mixed with the monomers to be polymerized.

Suitable surface active substances include not only the protective colloids customarily used for carrying out free radical aqueous emulsion polymerizations but also emulsifiers. Examples of suitable protective colloids are polyvinyl alcohols, cellulose derivatives and vinylpyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the surface active substances used are exclusively emulsifiers whose relative molecular weights are customarily below 1000, in contradistinction to the protective colloids. They can be anionic, cationic or nonionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3–50, alkyl radical: $C_4$–$C_9$), ethoxylated fatty alcohols (EO degree: 3–50, alkyl radical: $C_8$–$C_{36}$), and also alkali metal and ammonium salts of alkyl sulfates (alkyl radical: $C_8$–$C_{12}$), of sulfuric monoesters of ethoxylated alkanols (EO degree: 4–30, alkyl radical: $C_{12}$–$C_{18}$), and ethoxylated alkylphenols (EO degree: 3–50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers may be found in Houben-Weyl, Methoden der organischen Chemie, Volume XIV/1, Makromolekulare Stoffe, Georg Thieme Verlag, Stuttgart, 1961, pages 192 to 208.

Particularly suitable surface active substances are compounds of the general formula I

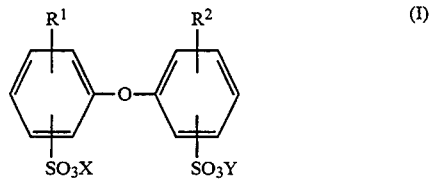

where $R^1$ and $R^2$ are each hydrogen or $C_4$–$C_{24}$-alkyl but are not both hydrogen, and X and Y are each an alkali metal or ammonium ion. In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax® 2A1 (trademark of the Dow Chemical Company). In the process of the invention compounds I are preferably used as the sole surface active substances and particularly preferably in mixture with ethoxylated fatty alcohols (EO degree: 3–50, alkyl radical: $C_8$–$C_{36}$). Compounds I are generally known, for example from U.S. Pat. No. 4,269,749, and are commercially available. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxodisulfates, but also azo compounds. Preference is given to using combined systems composed of at least one organic reducing agent and at least one peroxide and/or hydroperoxide, e.g. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although in the case of ascorbic acid it is also common to employ the sodium salt of hydroxymethanesulfinic acid, sodium sulfite, sodium hydrogensulfite or sodium disulfite and instead of hydrogen peroxide it is common to employ tert-butyl hydroperoxide or alkali metal peroxodisulfates and/or ammonium peroxodisulfate. Instead of a water-soluble iron(II) salt it is common to employ a combination of water-soluble Fe/V salts. The amount of free radical initiator system used is preferably from 0.1 to 2% by weight, based on the total amount of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as part of the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperature employed will be between room temperature and 100° C., preferably within the range from 50° to 95° C. The employment of superatmospheric or reduced pressure is possible, so that the polymerization temperature may also exceed 100° C. and may in fact be as high as 130° C. Volatile monomers such as ethylene, butadiene or vinyl chloride are preferably polymerized under superatmospheric pressure. To control the pH of the polymerization medium ammonia, for example, may be added during the free radical aqueous emulsion polymerization of the invention.

The radical polymereizable monomers mentioned by way of example as suitable for the free radical aqueous emulsion polymerization of the invention are suitable not only for use as constituents of the monomer mixture to be polymerized, but also, in the same way as the polymerization initiators, molecular weight regulators and pH regulators recommended for the aqueous emulsion polymerization of the invention, for use as constituents of the starting polymers I, II and of the starting dispersions containing these, although the monomer, regulator and initiator composition for the aqueous starting dispersions I, II can be not only congruent with but also different from the monomer mixture to be polymerized according to the invention. This applies mutatis mutandis necessarily also to the surface active substances to be used for preparing the aqueous starting dispersions I, II, since in the process of the invention, relative to the amounts of starting polymers I and II, at least 10–50 (starting dispersion I) and at least 1–5% by weight (starting dispersion II) of the surface active substances finally contained in the final aqueous polymer dispersion of the invention are already part of the aqueous starting dispersions I, II to be added. These amounts of surface active substances are in general the minimum amounts required for preparing stable aqueous starting dispersions I, II.

Aqueous starting dispersions I to be added according to the invention of a starting polymer I in which the starting polymer I is present in the form of dispersed starting polymer particles having a non-zero weight average particle diameter $d_w$ of less than or equal to 50 nm, preferably from 25 to 45 nm, are obtainable in a conventional manner. Appropriate teaching may be found for example in Houben-Weyl, Methoden der organischen Chemie, Volume E 20, part I, Makromolekulare Stoffe, Georg Thieme Verlag, Stuttgart, 1987, pages 248 to 268. If the solids content is to be a preferred 20–40% by weight, the starting dispersions I are obtainable in a particularly simple manner, for example by mixing together the aqueous phase, the monomers, the free radical initiators (normally from 0.1 to 5% by weight, based on the amount of starting monomers to be polymerized), and surface active substances (customarily from 10 to 50% by weight, based on the starting monomers to be polymerized) at a low temperature and heating the mixture to the polymerization temperature and polymerizing it (the particle diameter $d_w$ generally decreases with increasing surface active substance). In another version, the initial charge comprises essentially all the components, but the polymerization initiator is added continuously after the charge has been heated to the reaction temperature and while it is maintained at that temperature. As regards the polymerization temperature and pressure the earlier statements about the process of the invention apply. Aqueous starting dispersions I which have a broad particle size distribution are preferred. Preference is also given to those starting dispersions I which contain as surface active substances exclusively those of the general formula I.

Starting dispersions II are likewise obtainable in a manner known per se to one skilled in the art. Essentially, they can be prepared in the same way as the starting dispersions I except for the difference that the amount of surface active substances used relative to the monomers to be polymerized is in general merely 1–5% by weight. Preferred starting dispersions II are those which have a broad particle size distribution. Particular preference is given to aqueous polymer dispersions claimed in the main claim of DE-A 4,213,965 (O.Z. 0050/43182), which in general have the following particle size distribution:

5–25% by weight of polymer $\leq 200$ nm

15–40% by weight of polymer $\leq 400$ nm

35–75% by weight of polymer $\leq 600$ nm

45–90% by weight of polymer $\leq 800$ nm

100% by weight of polymer $\leq 1600$ nm.

Other suitable starting dispersions II are the aqueous polymer dispersions claimed in claim 6 of DE-A 4,213,968 (O.Z. 0050/43185).

If starting dispersion polymers II having a narrow particle size distribution are used, the amount thereof used in the process of the invention is preferably from 2 to 10, particularly preferably from 2 to 5%, by weight, based on the total mass formed of the mass of the at least one radical polymerizable monomer and the masses of starting polymers I, II added in the form of aqueous starting dispersions I, II.

Very particular preference is given to using as starting dispersions II final polymer dispersions which in turn have been obtained by the process disclosed in the present invention. At least part of the final aqueous polymer dispersion obtainable therein can in turn be used again as starting dispersion II, and so on. If as part of such a cyclical procedure otherwise constant amounts and starting materials are employed, the remarkable result is that, generally independently of the dispersity of the particle size distribution of the original starting dispersion II and at the latest after the third cycle, a final polymer dispersion whose application properties (flowability) will in general not change within the margin of error of measurement in the course of further cycles. This cyclical procedure offers in particular an elegant way of producing the final aqueous polymer dispersions of the invention in succession in essentially constant quality in a simple, industrially implementable manner by using a constant proportion of the final polymer dispersion obtained as starting dispersion II in the subsequent cycle, with or without dilution, while keeping other process parameters constant. Industrial implementation of such a cyclical procedure is particularly simple when at the end of a cycle the final polymer dispersion in the polymerization vessel is only part-discharged (the proportion being discharged being customarily 80–90% by weight) and the remainder is used with or without dilution as starting dispersion II in the next cycle, and so on. Under constant conditions three cycles will in general, as mentioned, result in an essentially steady state, ie. an end product of essentially consistent quality (flowability). Normally, the starting dispersions II are used in the process of the invention with a solids content of from 40 to 60% by weight. In general, the particle diameters of starting dispersion II are $\leq 2000$ nm. Of course, the aqueous starting dispersion II to be used according to the invention can also be prepared immediately beforehand in the same polymerization vessel in which the actual process of the invention is to be carried out, whether for example by mixing different polymer dispersions in the polymerization vessel (a simple way of preparing an aqueous starting dispersion II having a broad particle size distribution) and/or by carrying out a free radical aqueous emulsion polymerization therein.

In the latter case, the two emulsion polymerization processes can merge smoothly, in particular when the aqueous starting dispersion II is prepared employing the stream addition process, in which part of the polymerization batch is introduced as initial charge and heated to the polymerization temperature and the remainder is then added to the ongoing polymerization in a stream or spatially separate streams. Of course, in the course of the aqueous free radical emulsion polymerization of the invention it is possible for there to be a change in the composition not only of the monomers to be added but also of the aqueous starting dispersion I to be added. Furthermore, the additions can take place not only stepwise but also continuously or by the gradient method. Preferably, the addition of the monomers to be polymerized takes place relative to the addition of the at least one aqueous starting dispersion I in such a way that V is within the range >0 to 5 at any time after the start of the aqueous emulsion polymerization of the invention. Here a continuous mode of addition is preferred not only for the monomers to be polymerized but also for the at least one aqueous starting dispersion I. It is particularly advantageous for the monomers to be polymerized and the at least one aqueous starting dispersion I to be added to be added continuously and synchronously starting at the same time and preferably finishing at the same time. Moreover, the monomers to be polymerized are advantageously added to the reaction zone in such a way that at any time of this addition the polymerization conversion of the monomers already added previously to the polymerization vessel is at least 90 mol %, particularly preferably at least 98 mol %. The monomers to be polymerized can be added not only by themselves but also preemulsified in an aqueous phase. If final aqueous polymer dispersions having a particularly high solids volume concentration are to be produced, the monomers to be polymerized are preferably added by themselves. Advantageously, prior to the start of the free radical emulsion polymerization of the invention the polymerization vessel contains only some of the free radical polymerization initiators, whereas the remaining free radical polymerization initiators are in general added to the polymerization zone at the start of the free radical emulsion polymerization of the invention via a spatially separate stream, which addition preferably takes place synchronously with the addition of the monomers to be polymerized, but in general will take longer than the latter addition. For this reason the initiation of the aqueous free radical emulsion polymerization of the invention is in general effected by adding monomers to be polymerized to an initial charge that already contains polymerization initiators, after heating to the polymerization temperature, or by accompanying the addition of these monomers to be polymerized by the addition of initiator, if the initial charge heated to the polymerization temperature does not contain any initiator. If, from the start of the free radical aqueous emulsion polymerization of the invention, surface active substances are added to the polymerization vessel in an amount exceeding the minimum amount of 10–50% by weight, based on starting polymer I, required in the at least one aqueous starting dispersion I, this addition is advantageously effected in such a way that at any time from the start of the free radical aqueous emulsion polymerization of the invention the amount of surface active substances contained in the polymerization vessel minus the minimum amounts of surface active substances introduced into the polymerization vessel as minimum amounts mentioned under k), l) is less than 3% by weight, based on the monomers already added to the polymerization vessel. Preferably the addition takes place synchronously with the monomer addition.

On completion of the actual polymerization process of the invention the mixture is preferably stirred for some additional hours while the polymerization temperature is maintained. This may be followed by customary measures for residual monomer removal, for setting a different pH or other methods of post-stabilization, including the subsequent addition of surface active substances. Of course, the various possible, generally spatially separate, feed streams can be mixed with one another immediately before entry into the polymerization vessel.

Preferred classes of final polymers are those composed to an extent of from 70 to 100% by weight of esters of acrylic and/or methacrylic acid with alkanols of from 1 to 12 carbon atoms and/or styrene or to an extent of from 70 to 100% by weight of styrene and/or butadiene or to an extent of from 70 to 100% by weight of vinyl chloride and/or vinylidene chloride, of which the class of the acrylates is particularly preferred and preferably comprises the following monomer compositions:

70–99% by weight of at least one ester of acrylic and/or methacrylic acid with alkanols of from 1 to 8 carbon atoms, 1–5% by weight of acrylic acid, methacrylic acid or a mixture thereof, and 0–25% by weight of vinyl acetate, styrene or a mixture thereof.

The free radical aqueous emulsion polymerization of the invention makes it possible to produce in a simple manner final aqueous polymer dispersions which have a very wide particle size distribution which has all the following particle size distributions:

5–30% by weight of the final polymer $\leq 200$ nm

20–55% by weight of the final polymer $\leq 300$ nm 45-70% by weight of the final polymer $\leq 400$ nm 60-85% by weight of the final polymer $\leq 600$ nm 75-95% by weight of the final polymer $\leq 800$ nm 100% by weight of the final polymer $\leq 2000$ nm.

It is presumably this specific particle size distribution which is responsible for the reduced flow resistance of the final aqueous polymer dispersions of the invention, which normally have Newtonian flow characteristics. The particle size distribution was determined in an analytical ultracentrifuge using the coupling PSD technique (see W. Mächtle, Angewandte Makromolekulare Chemie 162 (1988), 35-42 (No. 2735)); the particle size determinations on the aqueous starting dispersions having a less wide particle size distribution were likewise carried out using the analytical ultracentrifuge (cf. W. Mächtle, Makromolekulare Chemie 185 (1984), 1025-1039). Below a solids volume concentration of 50% by volume the effect of the particle size distribution on the flow resistance decreases progressively. The final aqueous polymer dispersions of the invention are generally obtained as described in an industrially readily implementable manner with solids volume concentrations of up to 75% by volume with fully satisfactory reproducibility and no flocs.

The final aqueous polymer dispersions of the invention show their advantageous properties particularly markedly at solids volume concentrations above 65% by volume, which is why such final polymer dispersions are preferred. They are generally suitable for use as binders and as materials for preparing coatings and adhesive joints, for which purpose they may have additionally mixed into them in a conventional manner assistants such as film forming aids, fillers or plasticizers.

EXAMPLES

Example 1

Preparation of starting dispersion I
SIa): a mixture of 65.4 kg of water,
  25 kg of n-butyl acrylate and
  22.25 kg of a 45% strength by weight aqueous solution of the surface active substance corresponding to Dowfax 2A1
was admixed at room temperature first with a solution of 0.0625 kg of ascorbic acid and 0.005 kg of iron(II) sulfate in 2 kg of water and then in the course of 3 minutes with a mixture of 2 kg of water and 0.65 kg of a 30% strength by weight aqueous hydrogen peroxide solution. The temperature was then maintained at 52° C. for 1 h. Thereafter the mixture was cooled down to room temperature and following the addition of 0.05 kg of ascorbic acid in 1 kg of water additionally stirred for 2 h.

The resulting aqueous starting dispersion Ia) had a solids volume concentration of 28.5% by volume (solids content=30.2% by weight) and a weight average particle diameter $d_2$ of 32 nm.

SIb): a mixture of the composition
  51.12 kg of water,
  0.40 kg of a 30% strength by weight aqueous $H_2O_2$ solution,
  20 kg of n-butyl acrylate, and
  18.80 kg of a 45% strength by weight aqueous solution of the surface active substance corresponding to Dowfax 2A1
was admixed at 25° C. in one portion with 50% by weight of the feed stream defined hereinafter and then heated to 50° C. Then the remainder of the stream was added continuously over 30 min while the 50° C. were maintained. This was followed by a further hour of stirring at 50° C.

Feed stream: 4 kg of water
  0.20 kg of ascorbic acid
  0.001 kg of iron(II) sulfate The resulting aqueous starting dispersion Ib) had a solids volume concentration of 28.5% by volume (solids content=30.1% by weight) and a weight average particle diameter $d_w$ of 44 nm.

EXAMPLE 2

Preparation of starting dispersions II
SIIa): A mixture of the composition
  546 g of water
  1.35 g of ascorbic acid
  60 g of stream II
was heated to 85° C. and admixed continuously, starting at the same time, with the remainder of stream II (in the course of 3.5 h) and with stream I (in the course of 3 h) while the 85° C. were maintained. On completion of the addition of the remainder of stream II the mixture was additionally stirred at 85° C. for 1 h.

Stream I: 573 g of water
  1764 g of n-butyl acrylate
  36 g of methacrylic acid
  180 g of a 20% strength by weight aqueous solution of the surface active substance corresponding to Dowfax 2A1
  0.45 g of ascorbic acid Stream II: 600 g of water
  9 g of sodium peroxodisulfate The resulting aqueous starting dispersion IIa) had a solids volume concentration of 45.7% by volume (solids content=49.3% by weight) and an essentially monodisperse particle size distribution with a particle diameter $d_w$ of 294 nm.

SIIb): a mixture of the composition
  11.67 g of aqueous starting dispersion SIa) of Example 1,
  4.375 g of a 20% strength by weight aqueous solution of the surface active substance corresponding to Dowfax 2A1,
  17.50 g of a 30% strength by weight aqueous $H_2O_2$ solution,
  40.5 g of stream II, and
  600 g of water
was heated to 60° C. and while this temperature was maintained continuously admixed, starting at the same time, with the remainder of stream II and with stream I as per the following schedules:

| | |
|---|---|
| Stream I: | 5% by weight within 30 min, then 95% by weight within 150 min. |
| Stream II: | 90% by weight within 210 min. |

(% by weight based on the respective total amount)
Stream III was added continuously within 120 min starting 30 min from the start of the addition of stream I.

| Stream I: | | |
|---|---|---|
| | 1645 g | of n-butyl acrylate |
| | 70 g | of ethyl acrylate |
| | 35 g | of methacrylic acid |
| | 70 g | of a 20% strength by weight aqueous solution of the surface active substance corresponding to Dowfax 2A1 |
| | 175 g | of a 20% strength by weight |

-continued

| | | |
|---|---|---|
| | | aqueous solution of ethoxylated fatty alcohols (C$_{16}$-C$_{18}$, EO degree: 30) |
| | 0.875 g | of 3-mercaptopropyltrimethoxy-silane |
| | 391 g | of water |
| Stream II: | 5.25 g | of ascorbic acid |
| | 0.175 g | of iron(II) sulfate |
| | 400 g | of water |
| Stream III: | 58.33 g | of aqueous starting dispersion SIa) of Example 1 |
| | 13.13 g | of a 20% strength by weight aqueous solution of the surface active substance corresponding to Dowfax 2A1 |
| | 100 g | of water |

The resulting aqueous starting dispersion IIb) had a solids volume concentration of 45.6% by volume (solids content=50.3% by weight) and the following particle size distribution:

15% by weight of starting polymer IIb≦150 nm

58% by weight of starting polymer IIb≦200 nm

88% by weight of starting polymer IIb≦300 nm

100% by weight of starting polymer IIb≦400 nm

SIIc): a mixture of the composition
22.63 g of stream II,
42.00 g of stream III, and
300 g of water
was heated to 85° C. and while this temperature was maintained admixed continuously, starting at the same time, with the remainder of stream II and with stream I as per the following schedules:

| Stream I: | 4% by weight within 30 min, then 96% by weight within 180 min |
|---|---|
| Stream III: | 80% by weight within 240 min |
| (% by weight based on the respective total amount) | |
| The remainder of stream II was added continuously within 180 min starting 30 min from the start of the addition of stream I. | |
| Stream I: | 1710 g | of n-butyl acrylate |
| | 250 g | of methyl methacrylate |
| | 40 g | of methacrylic acid |
| | 1 g | of tart-dodecylmercaptan |
| | 50 g | of a 20% strength by weight aqueous solution of ethoxylated fatty alcohols (C$_{16}$-C$_{18}$, EO degree: 18) |
| | 100 g | of a 20% strength by weight aqueous solution of the surface active substance corresponding to Dowfax 2A1 |
| | 1 g | of 3-mercaptopropyltrimethoxy-silane |
| | 470 g | of water |
| Stream II: | 13.33 g | of aqueous starting dispersion SIa) of Example 1 |
| | 5 g | of a 20% strength by weight aqueous solution of the surface active substance corresponding to Dowfax 2A1 |
| | 8 g | of a 25% strength by weight aqueous ammonia solution |
| | 200 g | of water |
| Stream III: | 10.00 g | of sodium peroxodisulfate |

-continued

| 200 g | of water |
|---|---|

The resulting aqueous starting dispersion IIc) had a solids volume concentration of 56.1% by volume (solids content=61.1% by weight) and the following particle size distribution:

4% by weight of starting polymer IIc)≦200 nm

6% by weight of starting polymer IIc)≦300 nm

60% by weight of starting polymer IIc)≦400 nm

100% by weight of starting polymer IIc)≦600 nm

EXAMPLE 3

Preparation of final aqueous polymer dispersions according to the invention

Fa): 1000 g of SIIa) of Example 2 were heated to 85° C. and then continuously admixed at that temperature with streams I, II and III in the course of 4 h, starting at the same time. Subsequently the reaction mixture was maintained at 85° C. for a further 1 h.

| Stream I: | 1960 g | of n-butyl acrylate |
|---|---|---|
| | 40 g | of methacrylic acid |
| Stream II: | 25 g | of aqueous starting dispersion SIa) of Example 1 |
| | 170 g | of water |
| | 20 g | of a 10% strength by weight aqueous ammonia solution |
| | 150 g | of a 20% strength by weight aqueous solution of the surface active substance corresponding to Dowfax 2A1 |
| Stream III: | 160 g | of water |
| | 10 g | of sodium peroxodisulfate |

Fb): As for Fa), except that the initial charge contained only 500 g of SIIa) and that in stream II the 170 g of water were replaced with 320 g of water.

Fc): As for Fa), except that the initial charge contained only 250 g of SIIa) and that in stream II the 170 g of water were replaced with 400 g of water.

Fd): As for Fa), except that the initial charge contained 500 g of Fa) of Example 3 instead of 1000 g of SIIa) and that in stream II the 170 g of water were replaced with 470 g of water.

Fe): As for Fd), except that the initial charge contained Fd) instead of Fa).

Ff): As for Fe), except that the initial charge contained Fe) instead of Fd).

Fg): As for Ff), except that the initial charge contained Ff) instead of Fe).

The final polymer dispersions thus obtained are characterized in Table 1 (SC=solids content in % by weight, SV=solids volume concentration in % by volume, $\eta$=dynamic viscosity At 23° C. and a shear gradient of 487 s$^{-1}$ as per DIN 53 019 in mPa.s). The particle size distribution is reported in each case in terms of the proportion (%) by weight of the final polymer whose particle diameter is ≦X nm, where X is an element of the set {200, 300, 400, 600, 800, 1000, 1800}.

TABLE 1

| | SC | SV | $\eta$ | 200 | 300 | 400 | 600 | 800 | 1000 | 1800 |
|---|---|---|---|---|---|---|---|---|---|---|
| Fa) | 71.4 | 66.1 | 626 | 13 | 15 | 16 | 98 | 100 | | |

TABLE 1-continued

|     | SC   | SV   | η   | 200 | 300 | 400 | 600 | 800 | 1000 | 1800 |
|-----|------|------|-----|-----|-----|-----|-----|-----|------|------|
| Fb) | 71.0 | 65.7 | 330 | 15  | 17  | 17  | 95  | 100 |      |      |
| Fc) | 72.2 | 66.8 | 290 | 33  | 35  | 35  | 55  | 100 |      |      |
| Fd) | 72.1 | 66.8 | 243 | 18  | 44  | 45  | 45  | 92  | 100  |      |
| Fe) | 71.0 | 65.7 | 303 | 15  | 28  | 50  | 75  | 75  | 77   | 100  |
| Ff) | 72.3 | 66.9 | 291 | 18  | 35  | 48  | 70  | 88  | 90   | 100  |
| Fg) | 72.1 | 66.8 | 394 | 15  | 30  | 54  | 75  | 85  | 95   | 100  |

Fh): A mixture of

| Initiator-containing starting dispersion SIId) | 500.8 g | of SIIB) (Example 2) |
| --- | --- | --- |
| | 17.5 g | of a 30% strength by weight aqueous H$_2$O$_2$ solution |
| | 14.67 g | of stream II |
| | 100 g | of water | was heated to 60° C. an then admixed in one portion with 10% by weight of stream III. Then the continuous addition was commenced at the same time of the remainders of streams II and III and also of stream I (stream I and the remainder of stream II being added within 3 h, the remainder of stream III within 4 h) while the reaction temperature was raised to 70° C. and left at that level to the completion of the addition of stream III.

| Stream I: | 1645 g | of n-butyl acrylate |
| --- | --- | --- |
| | 70 g | of ethyl acrylate |
| | 35 g | of methacrylic acid |
| | 0.875 g | of 3-mercaptopropyltrimethoxysilane |
| | 175 g | of a 20% strength by weight aqueous solution of ethoxylated fatty alcohols (C$_{16}$–C$_{18}$, EO degree: 30) |
| | 70 g | of a 20% strength by weight aqueous solution of the surface active substance corresponding to Dowfax 2A1 |
| | 275 g | of water |
| Stream II: | 17.5 g | of a 20% strength by weight aqueous solution of the surface active substance corresponding to Dowfax 2A1 |
| | 29.17 g | of SIa) (Example 1) |
| | 100 g | of water |
| Stream III: | 5.25 g | of ascorbic acid |
| | 0.175 g | of iron(II) sulfate |
| | 100 g | of water |

Fi): As for Fh), except that the initial charge contained 500.8 g of Fh), (Example 3) instead of 500.8 g of SIIb) and that in stream I the 275 g of water were replaced with 388 g of water.

Fj): As for Fi), except that the initial charge contained Fi) instead of Fh).

Fk): As for Fj), except that the initial charge contained Fj) instead of Fi).

Fl): As for Fh), except that the initial charge contained 250.25 g of SIIb) instead of 500.8 g of SIIb) and that in stream I the 275 g of water were replaced with 335 g of water.

Fm): As for Fh), except that the initial charge contained 500.8 g of Fh) instead of 500.8 g of SIIb), that in stream I the 275 g of water were replaced with 320 g of water, that in stream II the 100 g of water were replaced with 200 g of water and that in stream III the 100 g of water were replaced with 200 g of water.

Fn): As for Fh), except that the streams I, II, III and the initial charge had the following compositions:

| Initial charge: | 256.94 g | of FM) (Ex. 3) | |
| --- | --- | --- | --- |
| | 9 g | of a 30% strength-by weight H$_2$SO$_2$ solution | Initiator-containing starting dispersion SIIE) |
| | 12.4 g | of stream II | |
| | 50 g | of water | |
| Stream I: | 666 g | of n-butyl acrylate | |
| | 36 g | of ethyl acrylate | |
| | 18 g | of methacrylic acid | |
| | 180 g | of vinyl acetate | |
| | 90 g | of a 20% strength by weight aqueous solution of ethoxylated fatty alcohols (C$_{16}$–C$_{18}$, EO degree: 30) | |
| | 36 g | of a 20% strength by weight aqueous solution of the surface active substance corresponding to Dowfax 2A1 | |
| | 172 g | of water | |
| Stream II: | 9.0 g | of a 20% strength by weight aqueous solution of the surface active substance corresponding to Dowfax 2A1 | |
| | 15.0 g | of SIa) (Example 1) | |
| | 100 g | of water | |
| Stream III: | 2.7 g | of ascorbic acid | |
| | 0.09 g | of iron(II) sulfate | |
| | 100 g | of water | |

Fo): As for Fn), except that in the initial charge the 256.94 g of Fm) were replaced with the corresponding amount of Fn).

Fp): As for Fn), except that in the initial charge the 256.94 g of Fm) were replaced with the corresponding amount of Fo). Additionally in stream I the vinyl acetate was replaced with the corresponding amount of styrene and in stream III the amount of ascorbic acid was increased to 5.4 g.

Fq): As for Fp), except that in the initial charge the 256.94 g of Fo) were replaced with the corresponding amount of Fp).

Fr): As for Fq), except that in the initial charge the 256.94 g of Fp) were replaced with the corresponding amount of Fq).

The final aqueous polymer dispersions thus obtained are characterized in Table 2 by the criteria set out for Table 1.

TABLE 2

|     | SC   | SV   | η   | 200 | 300 | 400 | 600 | 800 | 1000 | 1800 |
|-----|------|------|-----|-----|-----|-----|-----|-----|------|------|
| Fh) | 64.9 | 60.1 | 240 | 10  | 30  | 78  | 100 |     |      |      |
| Fi) | 65.2 | 60.4 | 300 | 34  | 48  | 56  | 92  | 100 |      |      |
| Fj) | 64.8 | 60.0 | 200 | 22  | 46  | 73  | 83  | 95  | 100  |      |

TABLE 2-continued

|     | SC   | SV   | η   | 200 | 300 | 400 | 600 | 800 | 1000 | 1800 |
|-----|------|------|-----|-----|-----|-----|-----|-----|------|------|
| Fk) | 64.6 | 59.8 | 190 | 25  | 52  | 64  | 89  | 92  | 96   | 100  |
| Fl) | 64.7 | 59.9 | 150 | 16  | 28  | 70  | 100 |     |      |      |
| Fm) | 62.4 | 57.8 | 83  | 16  | 50  | 65  | 83  | 83  | 95   | 100  |
| Fn) | 61.1 | 56.6 | 65  | 23  | 47  | 57  | 85  | 94  | 94   | 100  |
| Fo) | 60.1 | 54.7 | 35  | 28  | 46  | 65  | 78  | 92  | 98   | 100  |
| Fp) | 60.1 | 55.7 | 160 | 43  | 66  | 72  | 88  | 95  | 97   | 100  |
| Fq) | 60.6 | 55.6 | 87  | 28  | 64  | 82  | 92  | 98  | 100  |      |
| Fr) | 62.0 | 56.9 | 120 | 28  | 56  | 78  | 96  | 98  | 100  |      |

Fs): A mixture consisting of
  83.33 g of SIIc (Example 2)
  2.00 g of sodium peroxodisulfate and
  200 g of water
was heated to 85° C. and while that temperature was maintained continuously admixed within 30 min with 4% by weight of stream I to produce a starting dispersion IIf). Then without any time in between the addition was commenced of the remainder of stream I and the total amount of stream II and carried out continuously and completed within 320 min. Finally, the mixture was postpolymerized at 85° C. for 1 h.

| Stream I:  | 1710 g   | of n-butyl acrylate |
|            | 250 g    | of methyl methacrylate |
|            | 40 g     | of methacrylic acid |
|            | 80 g     | of a 20% strength by weight aqueous solution of the surface active substance corresponding to Dowfax 2A1 |
|            | 50 g     | of a 20% strength by weight aqueous solution of ethoxylated fatty alcohols ($C_{16}$–$C_{18}$, EO degree: 18) |
|            | 1 g      | of tert-dodecyl mercaptan |
|            | 1 g      | of 3-mercaptopropyltrimethoxy-silane |
|            | 307 g    | of water |
| Stream II: | 8 g      | of a 25% strength by weight aqueous ammonia solution |
|            | 13.33 g  | of SIa) of Example 1 |
|            | 20.00 g  | of a 20% strength by weight aqueous solution of the surface active substance corresponding to Dowfax 2A1 |
|            | 8 g      | of sodium peroxodisulfate |
|            | 100 g    | of water |

Ft): As for Fs), except that the 83.33 g of SIIc) in the initial charge were replaced with 250 g of Fs) (Example 3) and that in stream I the 307 g of water were replaced with 318 g of water.

Fu): As for Fs), except that the 83.33 g of SIIc) in the initial charge were replaced with 166.7 g of SIIc) and that in stream I the 307 g of water were replaced with 292 g of water.

Fv): As for Fs), except that the 83.33 g of SIIc) in the initial charge were replaced with 250 g of Fu) and that in stream I the 307 g of water were replaced with 318 g of water.

Fw): As for Fs), except that the 83.33 g of SIIc) in the initial charge were replaced with 250 g of SIIc) and that in stream I the 307 g of water were replaced with 277 g of water.

Fx): As for Fs), except that the 83.33 g of SIIc) in the initial charge were replaced with 250 g of Fw) and that in stream I the 307 g of water were replaced with 318 g of water.

The final aqueous polymer dispersions thus obtained are characterized in Table 3 according to the criteria set out for Table 1.

TABLE 3

|     | SC   | SV   | η   | 200 | 300 | 400 | 600 | 800 | 1000 | 1500 | 2000 |
|-----|------|------|-----|-----|-----|-----|-----|-----|------|------|------|
| Fs) | 72.4 | 66.5 | 240 | 3   | 5   | 40  | 52  | 57  | 61   | 100  |      |
| Ft) | 72.2 | 66.3 | 220 | 3   | 10  | 46  | 52  | 58  | 83   | 87   | 100  |
| Fu) | 72.5 | 66.6 | 360 | 2   | 25  | 40  | 44  | 47  | 88   | 100  |      |
| Fv) | 72.6 | 66.7 | 270 | 3   | 12  | 38  | 40  | 77  | 80   | 82   | 100  |
| Fw) | 72.4 | 66.5 | 420 | 4   | 36  | 38  | 40  | 58  | 97   | 100  |      |
| Fx) | 72.8 | 66.9 | 190 | 4   | 24  | 28  | 66  | 70  | 75   | 100  |      |

We claim:

1. An aqueous polymer dispersion whose solids volume concentration is $\geq 50\%$ by volume and which has all the following polymer particle size distributions:

5–30% by weight of the polymer $\leq 200$ nm

20–55% by weight of the polymer $\leq 300$ nm

45–70% by weight of the polymer $\leq 400$ nm

60–85% by weight of the polymer $\leq 600$ nm

75–95% by weight of the polymer $\leq 800$ nm

100% by weight of the polymer $\leq 2000$ nm, the polymer being formed from free radically polymerizable monomers.

2. An aqueous polymer dispersion as claimed in claim 1, wherein said aqueous polymer dispersion has a solids volume concentration of $\geq 65\%$ by volume.

3. An aqueous polymer dispersion as claimed in claim 1, wherein said aqueous polymer dispersion comprises a polymer comprising:
   from 70–99% by weight of a $C_{1-8}$ alkanol ester of acrylic acid, a $C_{1-8}$ alkanol ester of methacrylic acid or a mixture thereof,
   from 1–5% by weight of acrylic acid, methacrylic acid or a mixture thereof, and
   from 0–25% by weight of vinyl acetate, styrene or a mixture thereof.

4. An aqueous polymer dispersion as claimed in claim 3, wherein said aqueous polymer dispersion has a solids volume concentration of $\geq 65\%$ by volume.

5. An aqueous polymer dispersion as claimed in claim 1, further comprising at least one surface active substance of the formula I

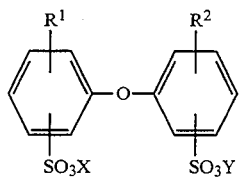

where $R^1$ and $R^2$ are each hydrogen or $C_{4-24}$-alkyl, but are not both hydrogen, and X and Y are each an alkali metal or ammonium ion.

6. An aqueous polymer dispersion as claimed in claim 5, wherein said aqueous polymer dispersion has a solids volume concentration of $\geqq 65\%$ by volume.

7. An aqueous polymer dispersion as claimed in claim 1, wherein said aqueous polymer dispersion comprises a polymer comprising from 70 to 100% by weight of a $C_{1-12}$ alkanol ester of acrylic acid, a $C_{1-12}$ alkanol ester of methacrylic acid, styrene or a mixture thereof.

8. An aqueous polymer dispersion as claimed in claim 1, wherein said aqueous polymer dispersion comprises a polymer comprising from 70 to 100% by weight of styrene, butadiene or a mixture of butadiene and styrene.

9. An aqueous polymer dispersion as claimed in claim 1, wherein said aqueous polymer dispersion comprises a polymer comprising from 70 to 100% by weight of vinyl chloride, vinylidene chloride or a mixture thereof.

10. An aqueous polymer dispersion whose solids concentration is $\geqq 71\%$ by weight and $\leqq 75\%$ by volume and which has all the following polymer particle size distributions:

5–30% by weight of the polymer $\leqq 200$ nm

20–55% by weight of the polymer $\leqq 300$ nm

45–70% by weight of the polymer $\leqq 400$ nm

60–85% by weight of the polymer $\leqq 600$ nm

75–95% by weight of the polymer $\leqq 800$ nm

100% by weight of the polymer $\leqq 2000$ nm, the polymer being formed from free radically polymerizable monomers.

11. An aqueous polymer dispersion whose solids volume concentration is $\geqq 65\%$ by volume and which has all the following polymer particle size distributions:

5–30% by weight of the polymer $\leqq 200$ nm

20–55% by weight of the polymer $\leqq 300$ nm

45–70% by weight of the polymer $\leqq 400$ nm

60–85% by weight of the polymer $\leqq 600$ nm

75–95% by weight of the polymer $\leqq 800$ nm

100% by weight of the polymer $\leqq 2000$ nm, the polymer being formed from free radically polymerizable monomers selected from the group consisting of acrylic acid, methacrylic acid, methyl acrylate, methyl methacrylate, ethyl acrylate, ethyl methacrylate, acrylonitrile, vinyl halides, vinylidene halides, vinyl acetate, vinyl propionate, acrylamide, methacrylamide and vinylsulfonic acid and water soluble salts thereof.

12. An aqueous polymer dispersion as claimed in claim 7, wherein said aqueous polymer dispersion has a solids volume concentration of $\geqq 65\%$ by volume.

13. An aqueous polymer dispersion as claimed in claim 8, wherein said aqueous polymer dispersion has a solids volume concentration of $\geqq 65\%$ by volume.

14. An aqueous polymer dispersion as claimed in claim 9, wherein said aqueous polymer dispersion has a solids volume concentration of $\geqq 65\%$ by volume.

* * * * *